US012627475B2

(12) United States Patent    (10) Patent No.:   US 12,627,475 B2

Eby et al.    (45) Date of Patent:   May 12, 2026

(54) ENCRYPTED CONTEXT-BASED PROMPT SYSTEM

(71) Applicant: American Express Travel Related Services Company, Inc., New York, NY (US)

(72) Inventors: Alaric M. Eby, Scottsdale, AZ (US); Andras L. Ferenczi, Scottsdale, AZ (US); Hilary Packer, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 47 days.

(21) Appl. No.: 18/678,350

(22) Filed: May 30, 2024

(65) Prior Publication Data

US 2025/0373414 A1    Dec. 4, 2025

(51) Int. Cl.
     *H04L 9/08*      (2006.01)

(52) U.S. Cl.
     CPC .......... *H04L 9/0825* (2013.01); *H04L 9/0838* (2013.01)

(58) Field of Classification Search
     CPC ............................. H04L 9/0825; H04L 9/0838
     See application file for complete search history.

(56) References Cited

U.S. PATENT DOCUMENTS

| | | | | |
|---|---|---|---|---|
| 10,958,424 | B1 * | 3/2021 | Chhabra | .................. H04L 9/083 |
| 11,922,942 | B1 * | 3/2024 | Kilinc | ..................... G10L 15/26 |
| 2020/0074111 | A1 * | 3/2020 | Mitchell | ............... H04L 63/102 |
| 2021/0314153 | A1 * | 10/2021 | Xuan | ......................... H04L 9/14 |
| 2022/0012725 | A1 * | 1/2022 | Rutter | ................... H04L 9/0618 |
| 2023/0421373 | A1 * | 12/2023 | Ryan | ..................... H04L 9/0894 |
| 2025/0021763 | A1 * | 1/2025 | Labonne | .............. G06F 40/186 |
| 2025/0029691 | A1 * | 1/2025 | Sauer | ..................... G06N 3/084 |

FOREIGN PATENT DOCUMENTS

CN      120378222 A   *   7/2025

* cited by examiner

*Primary Examiner* — Andrew Suh
(74) *Attorney, Agent, or Firm* — Thomas | Horstemeyer, LLP

(57)      ABSTRACT

Disclosed are various embodiments for an encrypted context-based prompt system for interactions between multiple entities. In one embodiment, a system comprising a computing device configured to receive a request to activate a prompt session. The request comprises a template identifier representing a type of interaction between a first device and a second device. A decrypted term is determined by decrypting an encrypted term associated with the request. A large language model prompt is generated based at least in part on the template identifier and the decrypted term. A proposed term is generated by executing a large language model application based at least in part on the large language model prompt. An encrypted proposed term is transmitted to the first client device or the second client device.

20 Claims, 8 Drawing Sheets

Figure 3A:
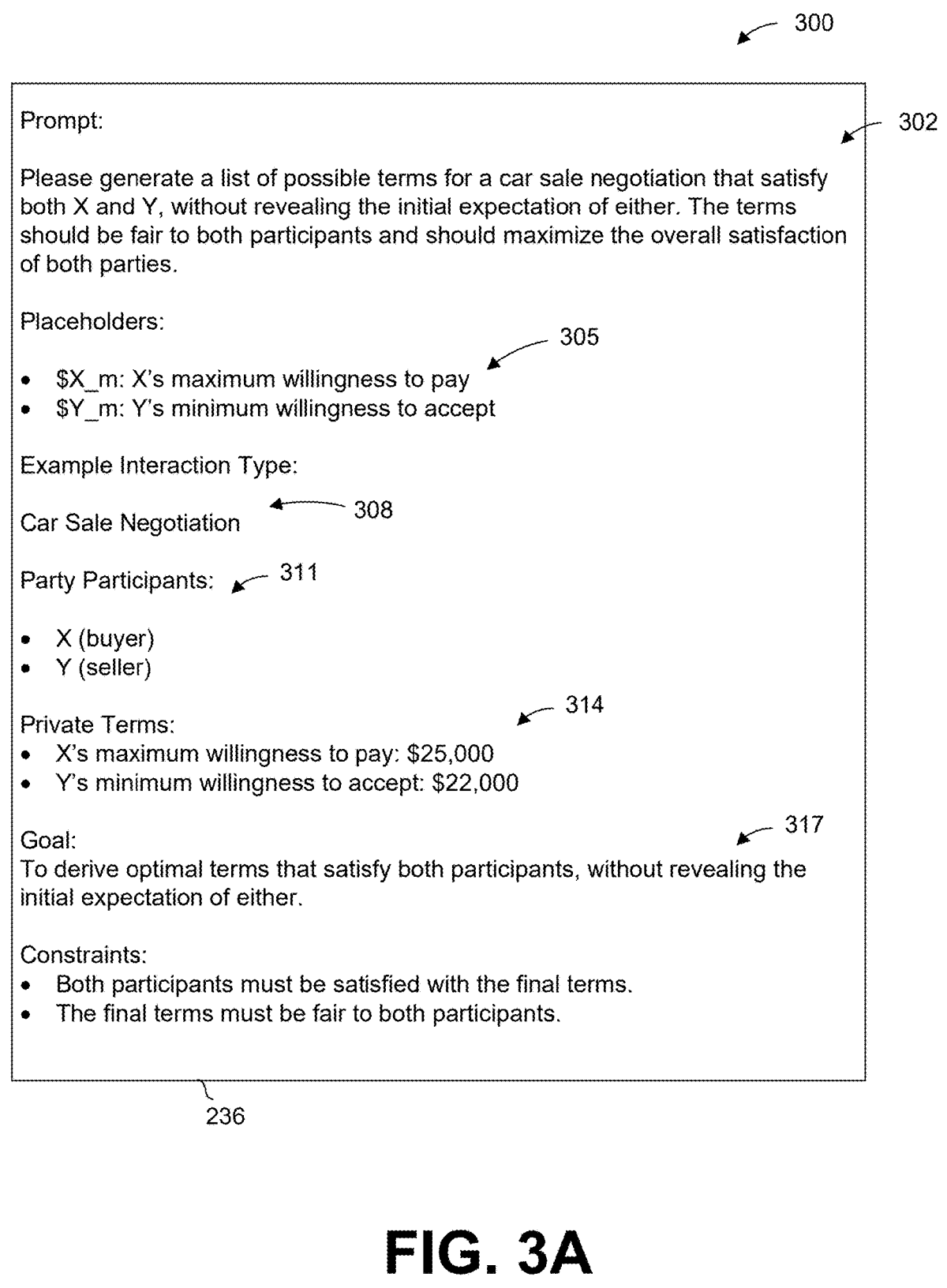

300

Prompt:                                                        302

Please generate a list of possible terms for a car sale negotiation that satisfy both X and Y, without revealing the initial expectation of either. The terms should be fair to both participants and should maximize the overall satisfaction of both parties.

Placeholders:                                    305

• $X_m: X's maximum willingness to pay
• $Y_m: Y's minimum willingness to accept Example Interaction Type:

Car Sale Negotiation          308

Party Participants:      311

• X (buyer)
• Y (seller)
                                                  314
Private Terms:
• X's maximum willingness to pay: $25,000
• Y's minimum willingness to accept: $22,000
                                                  317
Goal:
To derive optimal terms that satisfy both participants, without revealing the initial expectation of either.

Constraints:
• Both participants must be satisfied with the final terms.
• The final terms must be fair to both participants.

LLM Answer:                                                    328

To derive optimal terms that satisfy both participants without revealing their initial expectations, we can use the concept of a fair midpoint for negotiation. The midpoint between X's maximum willingness to pay ($XmXm$) and Y's minimum willingness to accept ($YmYm$) provides a reference point for deriving a list of terms that would likely be perceived as faith to both participants.

The fair midpoint is:                                          331
Midpoint=(Xm+Ym) /2

Given the example values:                                      334
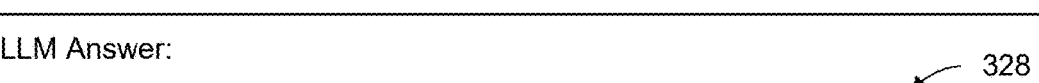
\text{Midpoint}=\frac{$25,000+$22,000}{2}=$23,500
Now, based on this midpoint, we can generate a list of possible terms. To ensure fairness, the terms will be distributed around this midpoint, providing a range that satisfies both X and Y:

Car Sale Negotiation Terms:
    1. $23,250          337                              340
    2. $23,500 (midpoint)
    3. $23,750
In this example, the terms are distributed with increments of $250 around the midpoint. This increment can be adjusted based on the granularity desired for the negotiation.

These terms represent offers that are between the maximum amount X is wiling to pay and the minimum amount Y is willing to accept. By negotiating within this range, both parties can reach a mutually satisfactory agreement without revealing their initial expectations.

ENCRYPTED CONTEXT-BASED PROMPT SYSTEM

BACKGROUND

During a negotiation, opposing parties can spend a significant amount of time presenting offers and counter offers. Various factors can affect the amount of time taken to negotiate terms for an agreement between parties, such as the time available for the parties, the methods used for communicating the offers, the number of terms that need to be agreed upon, and other suitable factors.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 3A and 3B are drawings of a user interface illustrating a large language model application being used to generate terms for a context interaction according to various embodiments of the present disclosure.

DETAILED DESCRIPTION

Figure 1:
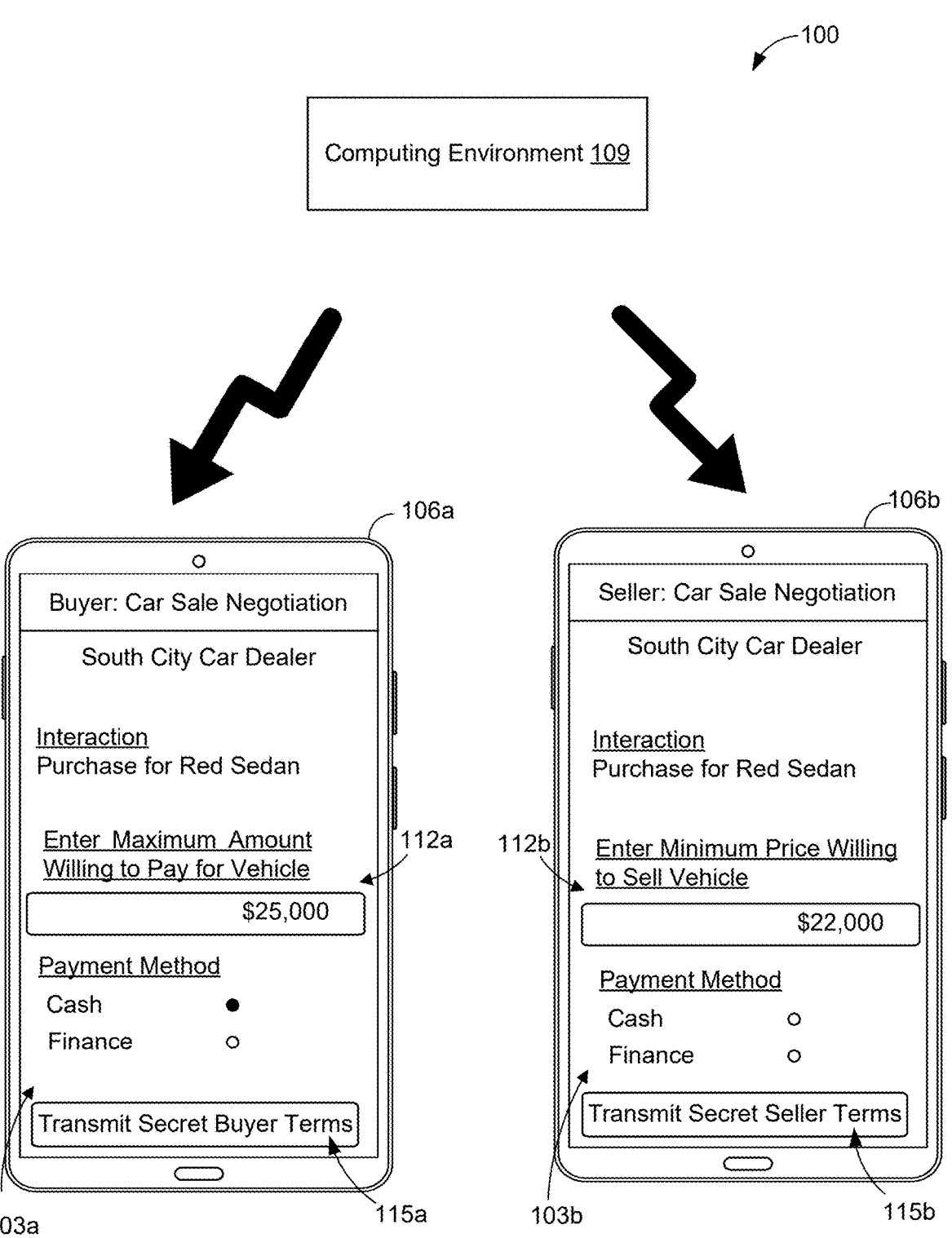
FIG. 1 is a drawing depicting a scenario of an application being used to negotiate the terms for a car sale according to various embodiments of the present disclosure.

The various embodiments of the present disclosure are directed to an encrypted context-based prompt system for determining terms between multiple parties for a context-based interaction. Often, during a negotiation, opposing parties spend a significant amount of time presenting offers and counter offers in order to obtain favorable terms. Various circumstances and factors can affect the amount of time taken to negotiate terms between parties. These factors can include the availability of participants, the methods used for communicating the offers, the location of the participants, the complexity of the terms, the quantity of terms, and other suitable factors.

The embodiments of the present disclosure include systems and methods for automatically determining negotiated terms between multiple parties without revealing each party's constraints and/or expectations for the interaction. For example, a car salesperson and a car buyer can use a software application for negotiating the terms of a car purchase. The car salesperson and the car buyer can enter their constraints within the application. Some illustrative and non-limiting constraints in this example can include the car buyer's maximum walk away price, the car seller's lowest available sales price, and/or the car seller's available financing options for the car buyer, etc. Without revealing each party's constraints to the opposing side, the software application can automatically determine one or more terms that would satisfy the constraints of both parties. The software application can be used for a wide variety of scenarios because the software application can identify a context interaction or negotiation scenario between the parties. From the identification of the context interaction, the software application can identify applicable rules, input data needed for placeholders associated with an interaction template for the context interaction, and other suitable data.

In some examples, these identified components can be used to generate a large language model prompt. A large language model application can receive the generated large language model prompt in order to negotiate terms. As such, different identified context interactions can cause the generation of different large language model prompts. One or more encryption layers can be used to conceal data associated with the constraints or private terms for each party and to conceal the proposed terms generated by the large language model for the interaction from unauthorized users.

Accordingly, various embodiments of the present disclosure provide various advantages. For example, various embodiments can include an implementation of an application protocol for discretely determining an agreement of terms and/or conditions between multiple client devices, which each have distinct constraints that need to be satisfied. The application protocol can improve a user's experience because the application protocol can reduce the amount of time spent identifying agreeable terms and conditions. The application protocol can further improve the user experience because it can be executed to handle various types of context interactions. The embodiments include various implementations for identifying a particular context interaction, recognizing the data (e.g., private user constraints, etc.) that needs to be retrieved from the user, and generating a text prompt that includes instructions for a large language model application, which can execute the large language model prompt for determining the proposed terms. As such, various embodiments can be used for a wide variety of interactions instead of relying on a dedicated software application for each context interaction. Further, various embodiments can include an encryption scheme for concealing data for the private constraints of individual parties from the other parties using the application protocol.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

With reference to FIG. 1, shown is a drawing depicting a scenario 100 of a mobile application 103 (a first mobile application 103a, a second mobile application 103b, collectively "the mobile applications 103") being used to negotiate terms for a first client device 106a and a second client device 106b. In this example, the first client device 106a is operated by a first party (e.g., a car buyer) and the second client device 106b is operated by a second party (e.g., car salesperson). The scenario 100 includes a computer environment 109 that enables the mobile applications 103 to interact and determine negotiated terms that satisfy the private terms 112 (the first set of private terms 112a, the second set of private terms 112b, collectively "the private terms 112") or constraints of each party.

The illustrated example can represent a context interaction in which the car buyer walks into a car dealership and selects a red sedan to purchase. The car salesperson can use the second client device 106b to initiate a negotiation of terms for the purchase of the red sedan with the first client device 106a of the car buyer. For example, the second mobile application 103b can initiate the context interaction by selecting a car purchase interaction in the second mobile application 103b and by identifying the first client device 106a, which is being used by the car buyer. The selection of the car purchase interaction can include entering information associated with the item for purchase, which is a red sedan in the illustrated example, In FIG. 1, the first client device 106a can execute a first mobile application 103a that allows for the entry of a first set of private terms 112a, such as the maximum price the car buyer is willing to spend and the payment method. In the illustrated example, the car buyer has entered into the first mobile application 103a that the car buyer does not want to spend more than $25,000 and the selected or preferred payment method for the car buyer is cash.

As illustrated, the second client device 106b can execute a mobile application 103b, which can provide a second user interface that allows for the entry of a second set of private terms 112b, such as the minimum price that the car salesperson is willing to sell the car to the buyer and a payment method associated with the minimum price. In the illustrated example, the car salesperson has entered into the second mobile application 103b that the minimum price that the car salesperson is willing to sell the car for is $22,000.

The private terms 112a and 112b (collectively "the private terms 112") can be exchanged once the user has confirmed the terms. For example, when the first user taps or presses the first transmit button 115a, the private terms 112a can be transmitted to the computing environment 109. Similarly, when the second user taps or presses the second transmit button 115b, the private terms 112b can be transmitted to the computer environment 109. Moreover, the private terms 112 can be encrypted prior to transmission to the computing environment 109 in order to conceal data for the private terms 112 from the counterparty. Various examples of an encryption scheme for encrypting the private terms 112 will be described in subsequent sections of the disclosure.

The computing environment 109 can decrypt the encrypted private terms 112 and determine a negotiated or proposed term that satisfies the private terms 112 from each party. The computing environment 109 can identify the context interaction between the parties and use a large language model service to generate the proposed term. For instance, the context interaction (e.g., the car purchase scenario), the decrypted terms from each party, and a prompt template for the context interaction can be provided as inputs to the large language model. The large language model can then generate a proposed term based at least in part on these inputs. In some examples, the large language model can be trained to identify rules, patterns, equations, and other data for determining the proposed terms for a specific context interaction. The proposed terms can then be sent to each party for acceptance.

Figure 2:
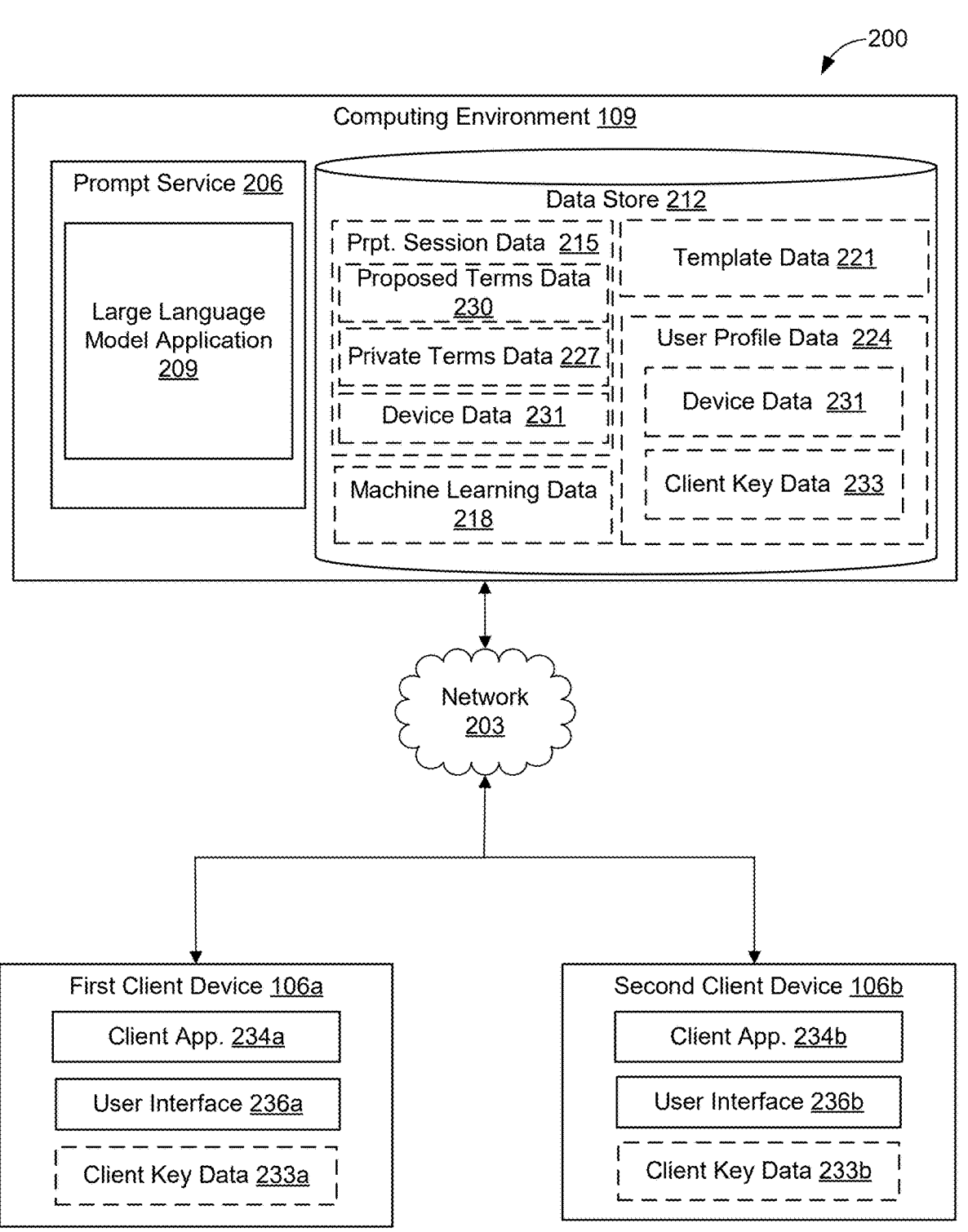
FIG. 2 is a drawing of a network environment according to various embodiments of the present disclosure.

With reference to FIG. 2, shown is a network environment 200 according to various embodiments of the present disclosure. The network environment 200 can include the first client device 106a and the second client device 106b (collectively "client devices 106" and generically "client device 106"), as well as the computing environment 109. The client devices 106 and computing environment 109 can be in data communication with each other via a network 203.

The network 203 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 203 can also include a combination of two or more networks 203. Examples of networks 203 can include the Internet, intranets, extranets, virtual private networks (VPNs), and similar networks.

The computing environment 109 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 109 can employ a plurality of computing devices that can be arranged in one or more server banks or computer banks or other arrangements. Such computing devices can be located in a single installation or can be distributed among many different geographical locations. For example, the computing environment 109 can include a plurality of computing devices that together can include a hosted computing resource, a grid computing resource or any other distributed computing arrangement. In some cases, the computing environment 109 can correspond to an elastic computing resource where the allotted capacity of processing, network, storage, or other computing-related resources can vary over time.

Various applications or other functionality can be executed in the computing environment 109. The components executed on the computing environment 109 include a prompt service 206, and other applications, services, processes, systems, engines, or functionality not discussed in detail herein.

The prompt service 206 can be executed to generate one or more proposed terms that satisfy the private terms, constraints, and/or expectations of multiple parties engaged a context interaction. Some non-limiting examples of context interactions between multiple parties can include a purchase, a negotiation, an agreement, and other suitable interactions. Other non-limiting examples of context interaction can include device interactions between multiples computing devices, such as device handshaking, device authentication, device authorization, and other suitable device interactions.

The prompt service 206 can include a large language model application 209 for receiving an entry of instructions and generating a response to the instructions. In some examples, the large language model application 209 can be trained to generate proposed terms for different types of context interactions based at least in part on training data. The training data can include historical data associated with the interactions.

The large language model application 209 can represent a large language model (LLM) that is executed for natural language processing tasks. In some examples, the large language model application 209 can include a large language model that utilizes a transformer model that includes feed forward layers, embedding layers, encoding layers, attention layers, and/or other suitable components. In some examples, the large language model application 209 can include a machine learning model that utilizes other architectural approaches (e.g., recurrent neural networks, long short-term memory networks, etc.). The large language model application 209 use a large language model prompt for generating a general-purpose language response. The large language model prompt can represent one or more statements (e.g., a series of text characters) that provide one or more instructions for the large language model application 209 to execute.

Also, various data can be stored in a data store 212 that is accessible to the computing environment 109. The data store 212 can be representative of a plurality of data stores 212, which can include relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. The data stored in the data store 212 is associated with the operation of the various applications or functional entities described below. This data can include prompt session data 215, machine learning data 218, template data 221, user profile data 224, and potentially other data.

The prompt session data 215 can represent data for one or more prompt sessions for a context interaction between the client devices 106 of multiple parties engaged to determine a set of proposed terms. In some examples, the data sessions can occur over the network 203 or a local wireless network (e.g., Bluetooth®, WiFi®, etc.) between multiple client devices 106. The prompt session data 215 can include private terms data 227, proposed terms data 230, device data 231, the type of context interaction, and other suitable data. The private terms data 227 can represent private constraints or expectations set by a party during the context interaction, which are intended to be concealed from other parties involved in the context interaction.

The proposed terms data 230 can represent the negotiated terms that have been determined by the prompt service 206. In some embodiments, the negotiated terms could satisfy all of the private terms or a threshold quantity of the private terms. In some examples, the prompt service 206 may not be able to satisfy all of the private terms. Then, the prompt service 206 can generate proposed terms that satisfy a threshold quantity of private terms.

The device data 231 can represent data associated with the client device 106, such as a hardware-based device identifier (e.g., serial number, International Mobile Equipment Identity (IMEI) number, MAC address, etc.), an email address, an Internet Protocol (IP) identifier, a phone number, and other suitable device data 230. The prompt session data 215 can also include device data 231 associated with each client device 106 involved in an interaction.

The machine learning data 218 can represent data associated with generating, validating, and deploying machine learning models used for generating the proposed terms data 230. For example, machine learning models can be generated and used by a large language model application 209 for generating the proposed terms. The machine learning models can be trained on historical data associated with different context interactions (e.g., purchase agreements, negotiation agreements, etc.). In some examples, the training data can be used to generate large language models. In turn the large language models can be used generate templates, applicable rules, template placeholders, and other suitable data elements.

The template data 221 can represent data associated with one or more templates used for generating a large language model prompt. A template can be generated to be used for a particular context interaction (e.g., car purchase, a house purchase, a device-to-device interaction, etc.). The template data 221 can include a template identifier that uniquely distinguishes a template from other templates. The template can also include input placeholders, response placeholders, rules, and other suitable data elements. The input placeholders can represent for the different types of data that will be inputted (e.g., from a user, a third-party data source, etc.). The response placeholders can represent data that will be outputted to a client device 106. The rules can represent a method of generating the data for the response placeholder using the data in the input placeholders.

The user profile data 224 can represent an account or a profile for a user. The user profile data 224 can include device data 231, client key data 233, and other suitable data. The device data 231 can represent data associated with the client device 106, such as a device identifier, an IMEI number, an email address, a phone number, an IP address and other suitable device data 230. The prompt session data 215 can include device data 231 associated with each client device 106 involved in an interaction.

The client key data 233 can represent one or more encryption keys associated with the client devices 106. The client key data 233 can collectively refer to client key data 233a associated with the first client device 106a and client key data 233b associated with the second client device 106b. The encryption keys can be used for encrypting and decrypting the private terms, the proposed terms, and other suitable data associated with a context interaction. For example, the encryption keys can include symmetric encryption keys (referred to as "a symmetric key" or "symmetric keys"), asymmetric encryption keys, shared encryption keys (referred to as "a shared key" or "share keys"), and other suitable encryption keys. Symmetric keys can be generated using one or more symmetric key algorithm, such as Twofish, Advanced Encryption Standard (AES) Camellia, Salsa20, ChaCha20, Blowfish, and other suitable symmetric-key algorithms. Asymmetric encryption keys can represent asymmetric cryptography or cryptography, in which each key pair includes a public key and a private key. Some example public key algorithm includes Diffie-Hellman key exchange, Digital Signature Algorithm, Rivest-Shamir-Adleman, and other suitable algorithms.

The encryption keys can be static or dynamically generated for each individual context interaction. For example, a client device 106 can dynamically generate an encryption key for each particular context interaction in order to improve data security.

The client device 106 is representative of a plurality of client devices that can be coupled to the network 203. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), or other devices with like capability. The client device 106 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 106 or can be connected to the client device 106 through a wired or wireless connection.

A client device 106 can be configured to execute various applications such as a client application 234 (e.g., client application 234a and client application 234b, referred to collectively as "client applications 234" and generically as "client application 234") or other applications. The client application 234 can be executed to generate proposed terms that satisfy the private terms of multiple parties involved in a context interaction. For example, the proposed terms can represent negotiated terms between the multiple parties. In some embodiments, the client application 234 is in data communication with the prompt service 206. Additionally, the client application 234 can be executed for concealing data associated with the private terms entered by a user. The client application 234 can execute one or more encryption schemes. Further, the client application 234 can be executed in a client device 106 to access network content served up by the computing environment 109 or other servers, thereby rendering a user interface 236 (e.g., user interface 236a and user interface 236b, collectively referred to as "user interfaces 236" and generically as "user interface 236") on the display. To this end, the client application 234 can include a browser, a dedicated application, or other executable, and the user interface 236 can include a network page, an application screen, or other user mechanism for obtaining user input. The client device 106 can be configured to execute applications beyond the client application 234 such as email applications, social networking applications, word processors, spreadsheets, or other applications.

Next, a general description of the operation of the various components of the network environment 200 is provided. To begin, party A and party B can desire to negotiate a purchase of an item (e.g., a car, a house, etc.). In this example, the first client device 106a is operated by party A (e.g., a house seller) and the second client device 106b is operated by party B (e.g., house buyer). The two parties can use the first client device 106a to initiate a context interaction (e.g., a negotiation of terms for the purchase of the house) with the second client device 106b of the house buyer. For example, the first client application 234a can initiate the context interaction by selecting a house purchase as the context interaction and by selecting the second client device 106b as another party in the context interaction. The selection of the house purchase interaction can include entering information associated with the item for purchase (e.g., a house).

In this example, party A can submit to the first client application 234a a first set of private terms, such as the minimum price the house seller is willing to sell, the payment method, and other suitable conditions and/or constrains. For example, the house seller can enter into the first client application 234a that the house seller does not want to sell for less than $100,000, the house seller prefers an all cash offer, and that the house seller prefers a closing date thirty days from today.

Meanwhile, party B can submit to the second client application 234b a second set of private terms, such as the maximum price that the house buyer is willing to buy the house and a payment method associated for the purchase. For example, the house buyer can enter into the second client application 234b that the maximum price that the house buyer is willing to purchase the house is for $120,000.

After the client applications 234 have identified the private terms, the client applications 234 can encrypt the private terms to conceal data associated with the private terms from the counterparty. Various examples for encrypting the private terms will be described later. The client application 234 can transmit the encrypted private terms to the prompt service 206. The prompt service 206 can decrypt the encrypted private terms from each party and determine a negotiated or proposed term that satisfies the private terms for each party. The prompt service 206 can identify the context interaction (e.g., a scenario context) between the parties and use the large language model application 209 to generate the proposed term. For instance, the context interaction (e.g., a house purchase scenario) and the decrypted terms from each party can be used to generate a text prompt. The text prompt can be provided to the large language model application 209 as an input. The prompt service 206 can generate the text prompt to include other instructions based at least in part on the identified context interaction.

The large language model application 209 can generate one or more proposed terms based at least in part on the text prompt of the inputs. In some examples, the large language model application 209 can be trained to identify rules, patterns, equations and other data for determining the proposed terms for a specific context interaction. The proposed terms can be encrypted and sent to each party for acceptance.

For example, the large language model application 209 can generate a set of proposed terms for a cash purchase. The proposed terms may include three options, such as 1) $109,500, 2) $110,000 (midpoint), and 3) $110,500. In some examples, these proposed terms can be sent to each of the client applications 234. Each party can select one or more of the proposed terms the party may be willing to accept. For example, party A may select the second and third options for $110,000 and $110,500. Meanwhile, party B may select options 1) 109,500 and 2) $110,000. The selections can be returned from the respective client applications 234 to the prompt service 206. Accordingly, the prompt service 206 can determine that an agreement has been reached since both parties have accepted the second option of $110,000. The prompt service 206 can transmit back to the respective client applications 234 that an agreement has been reached for $110,000.

In some embodiments, the large language model application 209 can generate a set of proposed terms that include textual based terms, which the satisfy the private terms of the parties in the interaction. Continuing with the previous car purchase example, the encrypted private terms for the buyer can include a preference for a two year bumper to bumper warranty and a minimum constraint of at least a one year mechanical warranty. On the other side, the encrypted private terms for the seller can include a preference for a two year mechanical warranty and no bumper to bumper warranty. The seller can set a maximum constraint of a one year mechanical warranty and one year bumper to bumper warranty.

The large language model application 209 can evaluate the preferences, minimum constraints, maximum constraints, and other elements to generate the set of proposed terms. For instance, the set of proposed terms generated for the previous example can include a one year bumper-tobumper warranty and a one year mechanical warranty. This set of proposed terms satisfies the constraints of each party.

In another textual based scenario, the large language model application 209 can be used for negotiating terms or clauses in a commercial contract. For example, a client and a vendor can desire to negotiate clauses in a service contract. The encrypted private terms for the vendor can include a preference for a one way feedback clause in favor of the vendor. For instance, the vendor can provide an example of a preferred feedback clause that states "Providing feedback to Vendor's services is optional: To the extent client provides any feedback on Vendor's services, client grants a non-exclusive, worldwide irrevocable license to the Vendor for such feedback."

On the other hand, the encrypted private terms for the client can include a preference for a one way clause in favor of the client. For instance, the client can provide an example of a preferred feedback clause that states "Providing feedback to client's integration of Vendor's services is optional: To the extent Vendor agrees to provide any feedback on client's integration of Vendor's services, Vendor grants a non-exclusive, worldwide irrevocable license to the client for such feedback."

In this example, the generated set of proposed terms can include language that describes a fair position between both the preferences of parties. For instance, the set of proposed terms can generate a proposed clause that states "Neither party is expected to give feedback. But to the extent a party decides to give the other party feedback, the party giving the feedback grants a non-exclusive, worldwide irrevocable license to the receiving party for such feedback." As such, the large language model application 209 can generate negotiated positions that satisfies the constraints of the parties and is fair to all of the parties.

In some embodiments, the prompt service 206 and/or the large language model application 209 can be used to generate a template for a particular context interaction. The prompt service 206 can receive a request or an instruction for generating the template for a context interaction. The prompt service 206 can identify template conditions for generating the template based at least in part on the instructions for generating the template. Additionally, the large language model application 209 can generate set of template conditions in order to create template placeholders. Some non-limiting examples of template conditions can include a maximum price, a minimum price, payment method, an expiration time period for an agreement, item characteristics, location, and/or other suitable conditions.

In some examples, the prompt service 206 can create a set of placeholders in the template for one or more template conditions. Each placeholder can be assigned an identifier for later identifying the appropriate data for entering into the template. For instance, when the user input is received, the prompt service 206 can match the input to the appropriate template placeholder based at least in part on identifying the appropriate identifiers. Further, in some examples, the large language model application 209 can generate the set of rules applicable for the template based at least in part on the set of instructions. For instance, the set of rules can indicate that a lower sales price may be acceptable for a seller if the payment method is cash. The prompt service 206 can assign a template identifier to the generated template and store generated template in the data store 212.

Referring next to FIG. 3A, shown is a user interface 236 illustrating a prompt 300 for a large language model application 209. The large language model application 209 can use the prompt 300 for generating a template for a context interaction (e.g., a car purchase, a house purchase, etc.). In the illustrated embodiment, the prompt 300 is drafted for generating a list of proposed terms between two parties involved in a car purchase. As shown, the prompt 300 includes various conditions for generating the proposed terms. For example, the prompt 300 can include an initial set of instructions 302, a list of placeholders 305, a context interaction type 308, party participants 311, private terms 314, conditions 317 (e.g., goals, constraints, expectations, etc.), and/or other suitable data. The initial set of instructions 302 can represent a request to generate the list of proposed terms and that the initial expectation (e.g., private terms) should be concealed from the counterparty. As such, the initial set of instructions 302 can represent an instruction for identifying data entered by a party of a first respective client device 106 and concealing the data from a counterparty operating another client device 106. Further, the initial set of instructions 302 can indicate that the proposed terms should be generated such that they are fair to both parties.

The placeholders 305 can be provided in order to define variables associated with the context interaction, which can be associated with a template identifier. The context interaction type can be provided in order to define the type of context interaction, which is a car sale negotiation between a car buyer and a car salesperson. The party participants 311 can define the name of the parties and their roles in the interaction. The private terms 314 can be provided as private terms that would be concealed from the other counterparty. For example, X's private term represents the maximum that X is willing to pay for the car would be $25,000, in which X would like for the price to be as low as possible. The prompt 300 also includes additional conditions 317 (e.g., goals, constraints, etc.) for generating the proposed terms.

In some embodiments, the prompt 300 shown in FIG. 3A can represent an example method for generating a template for car purchase interaction types. In other examples, the prompt 300 can be used for training the large language model application 209 for car purchase interaction types.

Next, FIG. 3B illustrates the user interface 236 that includes a large language model (LLM) response 325 after the entry of the prompt 300 (FIG. 3A) to the large language model application 209. Generated by the large language model application 209, the LLM response 325 includes an explanation 328, a rule 331 (e.g., an equation), an example calculation 334, proposed terms 337, and an additional explanation 340.

The explanation 328 can recite some of the components of the prompt 300 (e.g., the private terms 314, the additional conditions 317, etc.) and can describe a rule 331 for generating the proposed terms 337. For example, the explanation 328 includes the initial set of instructions 302 for concealing data entered by a party from a counterparty operating another client device 106. In this instance, the rule 331 can be an equation for calculating the proposed terms 227. The example calculation 334 illustrates a calculation that uses the private terms 314. The additional explanation 340 can include an explanation as to how the proposed terms satisfy the initial set of instructions 302 and the additional conditions 317. In some examples, the large language model application 209 can use the LLM response 325 as a basis for generating a template for this particular context interaction.

Figure 4:
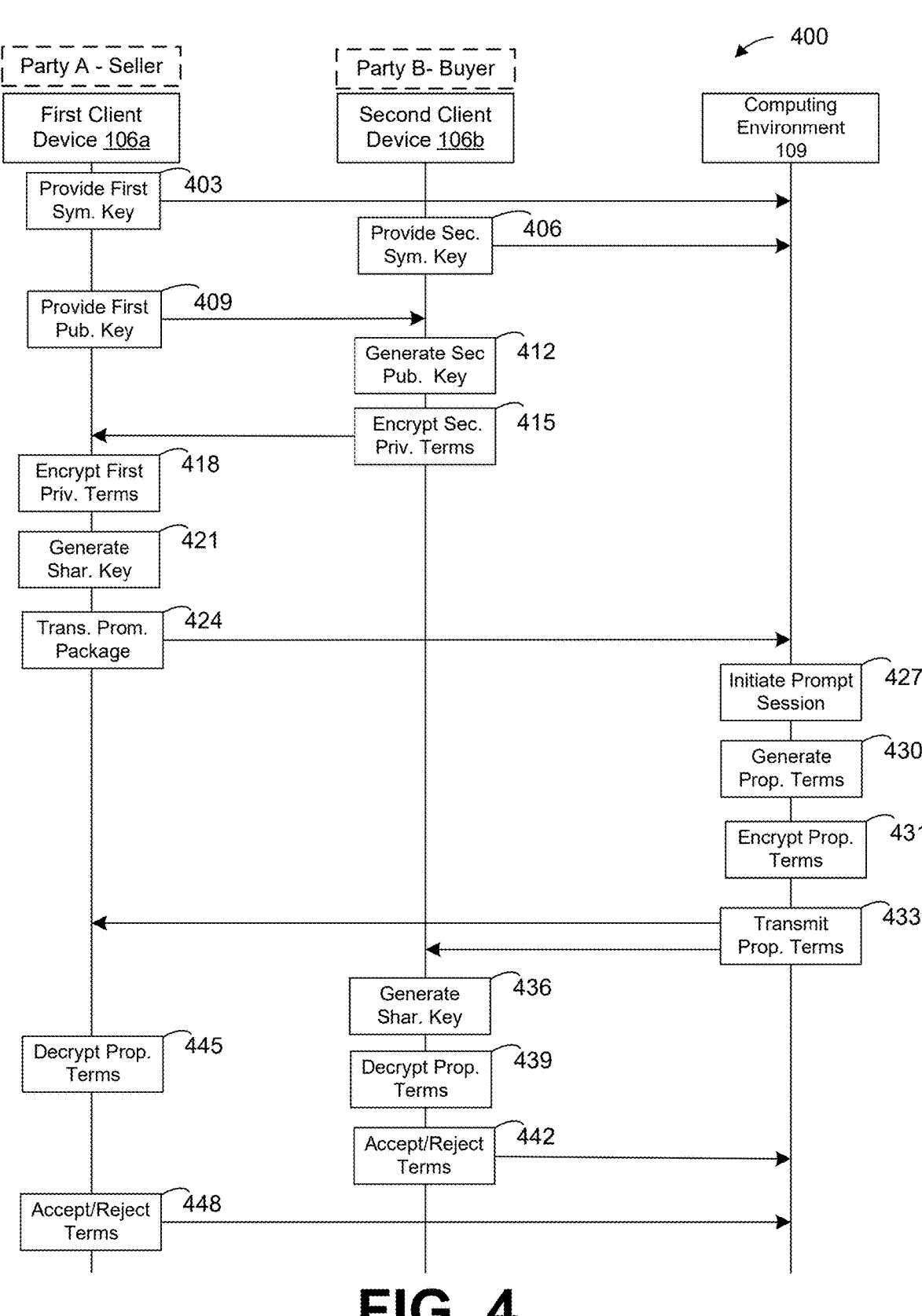
FIG. 4 is a sequence diagram illustrating one example of functionality implemented as portions of an application executed in a computing environment in the network environment of FIG. 2 according to various embodiments of the present disclosure.

Turning now to FIG. 4, shown is an example sequence diagram 400 of the operation of the network environment 200 from FIG. 2. The sequence diagram 400 of FIG. 2 provides merely an example of the many different types of functional arrangements that can be employed to implement the operation of the depicted portion of the operations of FIG. 2. FIG. 4 illustrates example operations of an encryption scheme. As an alternative, the sequence diagram 400 of FIG. 2 can be viewed as depicting an example of elements of a method implemented within the network environment 200.

To begin, party A can be operating a first client device 106a and party B can be operating a second client device 106b. Party A and party B can initiate a context interaction for purchasing of car. Party A can represent the seller and party B can represent the buyer. The data associated with the interaction can be stored as prompt session data 215.

In box 403, the sequence diagram 400 illustrates the first client device 106a providing the first symmetric key to the computing environment 109. The first client device 106a can generate client key data 233a, which can include the first client device 106a generating the first symmetric key. The first client device 106a can generate and provide the first symmetric key to the computing environment 109 for storage in a first user profile associated with party A. In some instances, the first client device 106a provides the first symmetric key as part of a registration process with the computing environment 109.

In box 406, the sequence diagram 400 illustrates the second client device 106b providing the second symmetric key to the computing environment 109. The second client device 106b can generate client key data 233b, which can include generating the second symmetric key. The second client device 106b can provide the second symmetric key to the computing environment 109 for storage in a second user profile associated with party B. In some instances, the second client device 106b provides the second symmetric key as part of a registration process with the computing environment 109.

In box 409, the sequence diagram 400 illustrates the first client device 106a providing the first public key to the second client device 106b. The first client device 106a can generate client key data 233a, which can include generating a first asymmetric key pair (e.g., first private key, first public key, etc.) for the first client device 106a. In this illustrated instance, the first client device 106a can transmit the first public key to the second client device 106b. In some examples, the first client device 106a can generate the first asymmetric key pair based at least in part on an initiation of the context interaction. In other examples, the first asymmetric key pair can be retrieved from the memory of the first client device 106a from a previous generation instance.

In some implementations, the first client device 106a can transmit the first public key via email, text message, a local wireless network (e.g., Bluetooth®, WiFi®, etc.), via an application programming interface (API) call, and other suitable communication methods. In other implementations, the first client device 106a can transmit the first public key via the first client application 234a, which can transmit the first public key to the computing environment 109 (e.g., the prompt service 206). For example, the first application 234a can make an API call and provide the first public key as an argument for the API call. In turn, the computing environment 109 can provide the first public key to the second client device 106b.

In box 412, the sequence diagram 400 illustrates that the second client device 106b can generate a second public key, which is part of a second asymmetric key pair (e.g., the second public key, the second private key). The second client device 106b can generate the second asymmetric key pair based at least in part on the initiation of the context interaction for the purchase, receiving the first public key, or other triggering conditions.

In box 415, the sequence diagram 400 illustrates the second client device 106b can encrypt the second private terms for party B. The second client device 106b can receive the second private terms from party B via a user interface 236. For example, the private terms can include a maximum amount party B is willing to pay for the car.

After being received from the user interface, the second client device 106b can encrypt the second private terms using the second symmetric key to generate the second encrypted content (e.g., a second cyphertext). Then, the second client device 106b can transmit to the first client device 106a the second encrypted content (e.g., a second encrypted term). In some examples, the second client device 106b transmits the second encrypted content, a user identifier for party B, the second public key associated with the second client device 106b, and other suitable content to the first client device 106a.

In box 418, the sequence diagram illustrates the first client device 106a can encrypt the first private terms for party A. The first client device 106a can receive the first private terms from party A via a user interface 236. For example, the first private terms can include a minimum price party A is willing to agree for the car sale.

After being received through the user interface, the first client device 106a can encrypt the first private terms using the first symmetric key to generate first encrypted content (e.g., a cyphertext A, first encrypted term).

In box 421, the sequence diagram 400 illustrates the first client device 106a can generate a shared key for encryption (e.g., a shared encryption key). The shared key can be generated based at least in part on a first encryption key from the first client device 106a and a second encryption key from the second client device 106b. For example, the shared key can be generated using a Diffie-Hellman Key Exchange Protocol based at least in part on a first private key from the first client device 106a and a second public key from the second client device 106b.

Then, the second client device 106b can transmit to the first client device 106a the second encrypted content. In some examples, the second client device 106b transmits the second encrypted content, a user identifier for party B, the second public key associated with the second client device 106b, and other suitable content to the first client device 106a.

In box 424, the sequence diagram illustrates the first client device 106a transmitting a prompt package to the computing environment 109. The first client device 106 can generate a prompt package that includes data for the computing environment 109 to initiate a prompt session. The prompt session can be initialized in order to generate the proposed terms. The proposed terms can be generated by the prompt service 206 and/or by the large language model application 209 based at least in part on the data included in the prompt package. The prompt package can include a template identifier, the shared key, the encrypted terms (e.g., first encrypted content, second encrypted content), a second user identifier for party B, a first user identifier for party A, and other suitable content. The first client device 106a can generate the prompt package based at least in part on data received from the second client device 106a and from data generated by the first client application 234a.

The template identifier can be determined by an initiation of the context interaction for the car purchase. For example, party A can select on the user interface 236 a user interface component for car purchase interaction. In other instances, a particular user identifier can be associated with a template identifier. For example, a user profile associated with a car dealership can cause the selection of a template identifier for car purchase interactions.

In box 427, the sequence diagram illustrates that the computing environment 109 initiates a prompt session (e.g., associated with prompt session data 215) based at least in part on the prompt package received from the first client device 106a. The computing environment 109 (e.g., the prompt service 206 and/or the large language model application 209) can generate a prompt for execution by the large language model application 209 based at least in part on the template identifier and the encrypted terms.

The computing environment 109 (e.g., the prompt service 206 and/or the large language model application 209) can generate the prompt by decrypting the encrypted terms by using the symmetric keys. For example, the computing environment 109 can use the first symmetric key to decrypt the first encrypted terms and the second symmetric key can be used to decrypt the second encrypted terms. The computing environment 109 can also retrieve a template associated with the template identifier from the data store 212.

The computing environment 109 can further generate the prompt by inserting the decrypted terms into the template associated with the template identifier. For example, the template can include a set of text and a set of placeholders for the decrypted terms in the set of text. The placeholders can have identifiers that are matched to identifiers associated with the decrypted terms. As such, the decrypted terms for party A can be identified as a seller term (e.g., seller identifier) and can be inserted into a seller placeholder (e.g., seller placeholder identifier) in the text for the template. The decrypted terms for the buyer can be identified as a buyer term (e.g., buyer identifier) and can be matched to the buyer placeholder in the text for the template. By inserting the decrypted terms into one or more placeholders, the computing environment 109 can form a complete text prompt for execution by the large language model application 209.

In box 430, the sequence diagram 400 illustrates that the computing environment 109 (e.g., the prompt service 206 and/or the large language model application 209) can generate the proposed terms by executing the prompt based at least in part on the insertion of the decrypted terms into the prompt. In some instances, the template for the text prompt can include a method or instructions for determining the proposed terms. For example, the selected template can include an equation for determining the proposed terms in this instance. The prompt service 206 and/or the large language model application 209 can insert values from the decrypted terms into the equation in order to determine the proposed terms.

In other instances, the large language model application 209 can be executed to determine a method for determining the proposed terms based at least in part on the text prompt generated with the decrypted terms. In some examples, the large language model application 209 can be trained for determining the optimal proposed terms based at least in part on historical data for a context interaction type.

In box 431, the sequence diagram 400 illustrates that the computing environment 109 (e.g., the prompt service 206 and/or the large language model application 209) can encrypt the proposed terms generated by the large language model application 209. For example, the computing environment 109 can encrypt the proposed terms using the shared key from the prompt package or other suitable encryption keys. In other examples, the encryption of the proposed terms is omitted.

In box 433, the sequence diagram 400 illustrates that the computing environment 109 can transmit the proposed terms generated by the large language model application 209 to the first client device 106a and the second client device 106b.

In box 436, the sequence diagram 400 illustrates that the second client device 106b can generate the shared key (e.g., a Diffie-Hellman encryption key) based at least in part on the second private key associated with the second client device 106b and the first private key associated with the first client device 106a. In some examples, the second client device 106b can generate the shared key in response to the receiving the proposed terms. In other examples, the shared key can be generated based at least in part on the encryption of the second private terms or the generation of the asymmetric key pair in box 412.

In box 439, the sequence diagram 400 illustrates that the second client device 106b can decrypt the encrypted proposed terms using the shared key. The second client device 106b can present the decrypted proposed terms to party B. The proposed terms can be presented via a user interface 236 or a speaker.

In box 442, the sequence diagram 400 illustrates that the second client device 106b can receive an answer B as an acceptance or a rejection on the user interface 236. The second client device 106b can transmit the answer B to the computing environment 109.

In box 445, the sequence diagram 400 illustrates the first client device 106a can decrypt the encrypted proposed terms using the shared key (e.g., from block 421). The first client device 106a can present the decrypted proposed terms to party A. The proposed terms can be presented via a user interface 236 or a speaker of the first client device 106a.

In box 448, the sequence diagram 400 illustrates the first client device 106a can receive an answer A as an acceptance or a rejection on the user interface 236. The first client device 106a can transmit the answer A to the computing environment 109. Thus, the operations of the sequence diagram 400 has ended.

Figure 5:
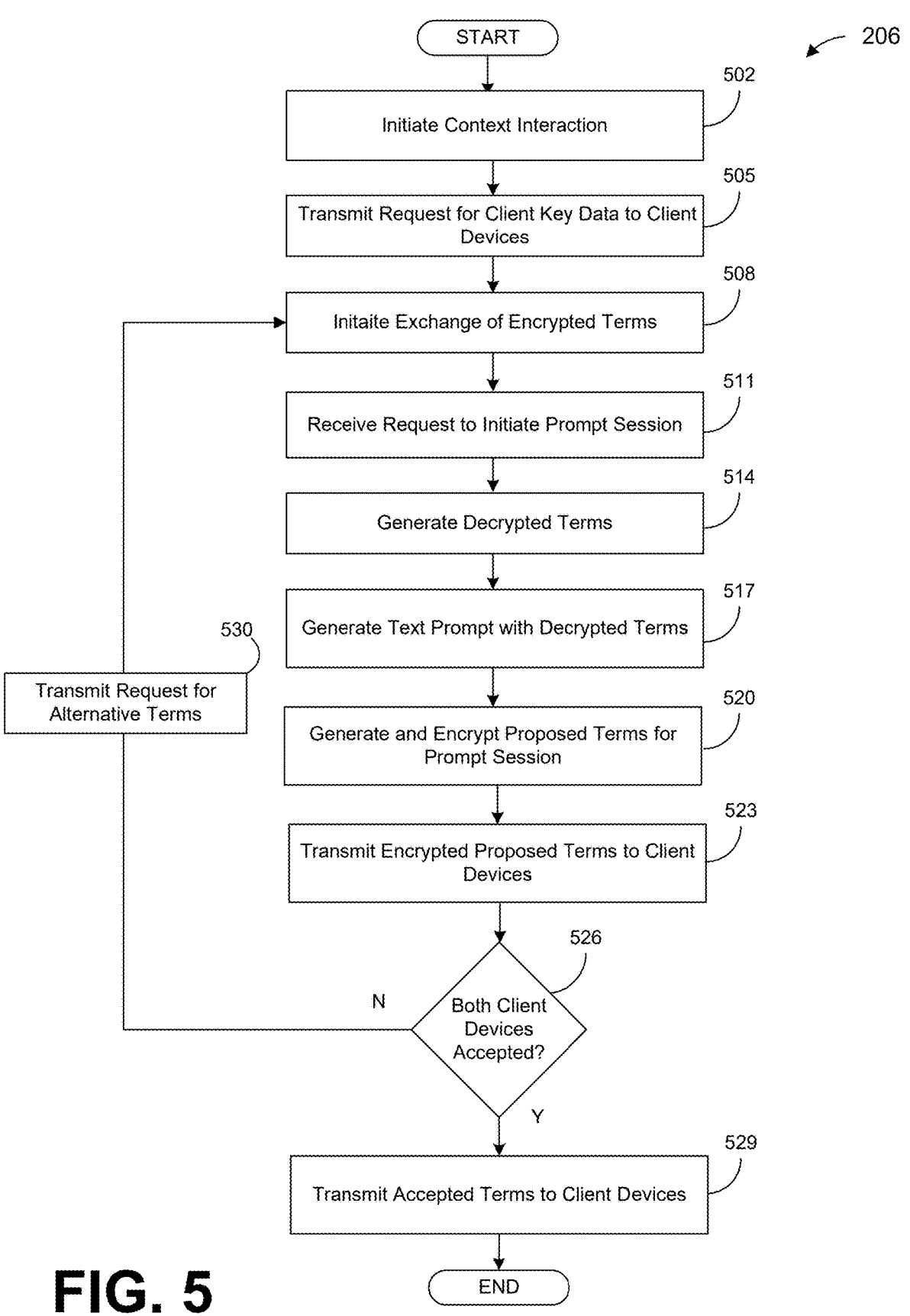
FIG. 5 is a flowchart illustrating one example of functionality implemented as portions of a service executed in a computing environment in the network environment of FIG. 2 according to various embodiments of the present disclosure.

Moving on to FIG. 5, shown is a flowchart that provides one example of the operation of a portion of the prompt service 206. The flowchart of FIG. 5 provides merely an example of the many different types of functional arrangements that can be employed to implement the operation of the depicted portion of the prompt service 206. As an alternative, the flowchart of FIG. 5 can be viewed as depicting an example of elements of a method implemented within the network environment 200.

To begin, party A can be operating a first client device 106a and party B can be operating a second client device 106b. Party A and party B can initiate a context interaction for an item purchasing. Party A can represent the seller and party B can represent the buyer. The data associated with the context interaction can be stored as prompt session data 215.

In block 502, the prompt service 206 can initiate a context interaction between multiple parties. In some examples, the initiation can involve a registration process for creating a user profile and receiving symmetric keys from the parties. In some embodiments, each client device 106 can generate a symmetric key and transmit the symmetric key to the prompt service 206, which the prompt service 206 stores in an appropriate user profile 224.

In block 505, the prompt service 206 can transmit requests for client key data 233 to the first client device 106a and/or the second client device 106b. In some examples, the prompt service 206 can initiate an exchange of client key data 233 by transmitting requests for public keys to the client devices 106. The prompt service 206 can receive the public keys and transmit the public keys to the client device 106 of the other party. In some examples, each client device 106 can generate an asymmetric key pair (e.g., a public key and a private key). In some instances, the prompt service 206 can instruct the client application 234 to generate the asymmetric key pairs and transmit the public key to the other party. In some examples, the prompt service 206 can receive the public key from each client device 106 and relay the counterparty's public key to the other client device 106. In some examples, block 505 is omitted because the client applications 234 can coordinate the exchange of encryption keys (e.g., public keys).

In block 508, the prompt service 206 can initiate an exchange of encrypted private terms from the parties. In some examples, the prompt service 206 can instruct each client device 106 to the retrieve and encrypt the respective private terms of their respective users. In some instances, the prompt service 206 can receive the encrypted private terms and provide the encrypted terms to the other party. In other instances, the second client device 106b can be instructed to provide encrypted terms to the first client device 106a. In turn, the first client device 106a can generate a prompt package that includes the encrypted terms of the second client device 106b.

In block 511, the prompt service 206 can receive a request to initiate a prompt session. The request can include a prompt package of the first encrypted private terms from the first client device 106a, the second encrypted private terms from the second client device 106b, the shared key, the template identifier, a first identifier (e.g., user profile identifier, device identifier, etc.) for the first client device 106a, a second identifier (e.g., user profile identifier, device identifier, etc.) for the second client device 106b, and other suitable data. Upon receiving the request, the prompt service 206 can initiate a prompt session (e.g., prompt session data 215).

In block 514, the prompt service 206 can decrypt the encrypted term associated with each party, which causes the generation of the decrypted private terms. For example, the prompt service 206 can decrypt a first encrypted term associated with the first client device 106a by using the first symmetric key and the prompt service 206 can decrypt a second encrypted term associated with the second client device 106b by using the second symmetric key. The prompt service 206 can identify the symmetric key by using the user identifiers.

In block 517, the prompt service 206 can generate a text prompt with the decrypted terms. The prompt service 206 can identify a template associated with the template identifier. The prompt service 206 can identify placeholders in the template and can insert the appropriate decrypted term into the appropriate placeholder. In some embodiments, the decrypted terms each have an identifier that is matched to a placeholder identifier in order to determine the appropriate location for the inserting the decrypted terms in the template.

In block 520, the prompt service 206 can generate the encrypted proposed terms. In some examples, the prompt service 206 can provide the prompt to the large language model application 209 and initiate the execution of the large language model application 209 in order to generate the proposed terms.

In block 523, the prompt service 206 can transmit the proposed terms to the client devices 106 for display. The proposed terms can be transmitted via email, via text message, push notifications, an API call from the client application 234, or via other suitable methods. In some instances, the proposed terms are transmitted to the individual client application 234. In some examples, the prompt service 206 can encrypt the proposed terms using the shared key.

In block 526, the prompt service 206 can determine whether all of the parties have accepted the proposed terms. If all of the client devices 106 have accepted the proposed terms, then the prompt service 206 proceeds to the block 529. If one of the client devices 234 has rejected the proposed terms, then the prompt service 206 proceeds to the block 530 for selecting different sets of private terms.

In block 529, the prompt service 206 can transmit an indication to the client applications 234 that all parties have agreed to the proposed terms. The prompt service 206 can transmit data for display on the client devices 106 that indicates that an agreement was reached between all of the parties. In some instances, the client device 106 can display the details of the agreement. Then, the prompt service 206 ends.

In block 530, the prompt service 206 can transmit a request for alternative terms to the client applications 234 of the client devices 106. The client applications 234 can display user interfaces 234 for presenting the requests. In some examples, the prompt service 206 can generate and transmit suggested private terms for display by the client devices 106. The prompt service 206 can generate the suggested private terms based at least in part on historical data. The prompt service 206 proceeds to the block 508 for initiating an encryption and an exchange of the alterative private terms.

Figure 6A:
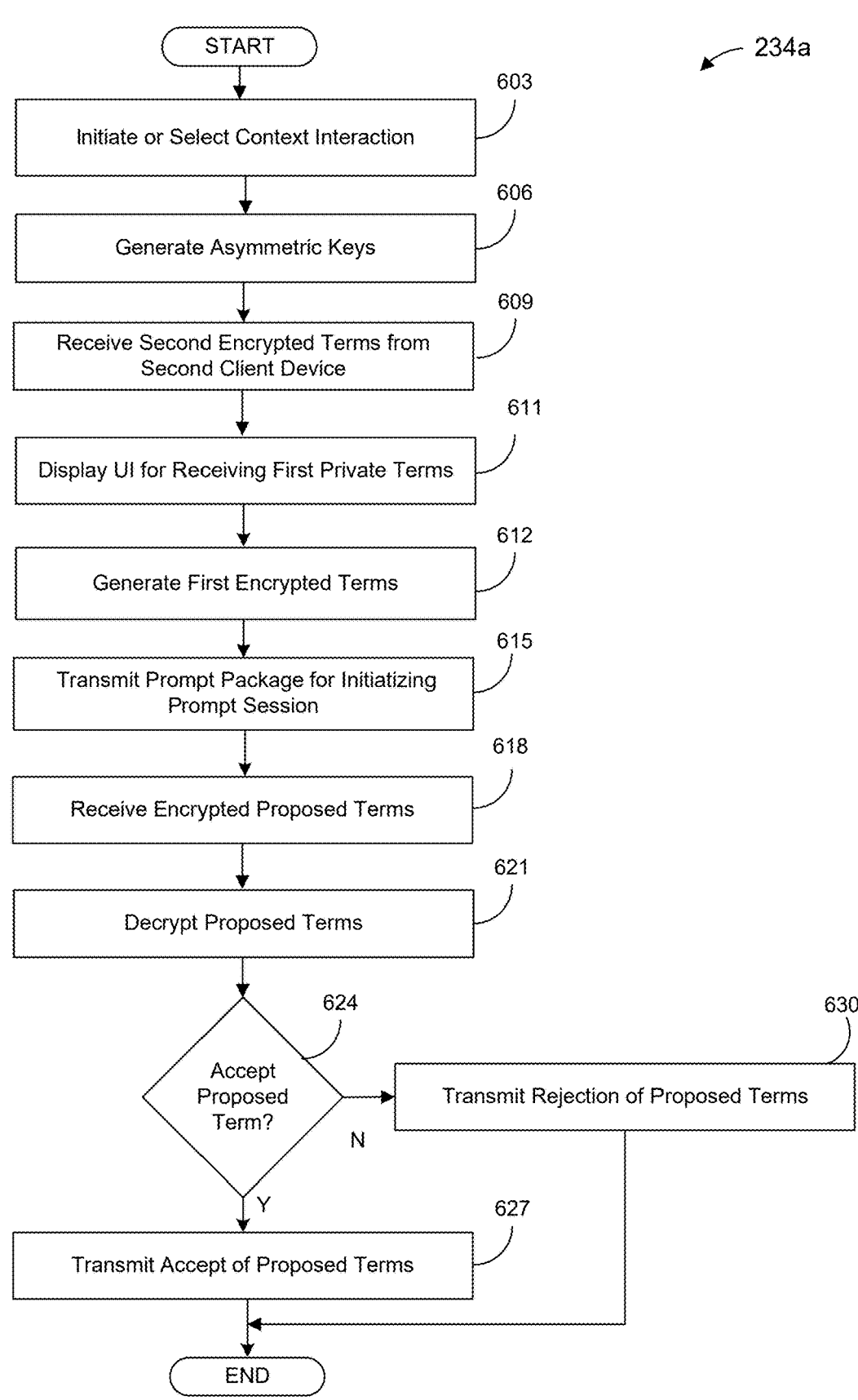
FIGS. 6A and 6B are flowcharts illustrating one example of functionality implemented as portions of an application executed in a client device in the network environment of FIG. 2 according to various embodiments of the present disclosure.

Referring next to FIG. 6A, shown is a flowchart that provides one example of the operation of a portion of the client application 234a executed in the first client device 106a. The flowchart of FIG. 6A provides merely an example of the many different types of functional arrangements that can be employed to implement the operation of the depicted portion of the client application 234a. As an alternative, the flowchart of FIG. 6A can be viewed as depicting an example of elements of a method implemented within the network environment 200.

To begin, party A can be operating the first client device 106a and party B can be operating the second client device 106b. Party A and party B can initiate an interaction for purchasing of an item. Party A can represent the seller and party B can represent the buyer. The purchase of the item is a non-limiting example. The functionality of FIG. 6A can be executed for other types of interactions. The data associated with the context interaction can be stored as prompt session data 215.

In block 603, the first client application 234a can initiate and/or select a context interaction (e.g., for the purchase of the item). The first client application 234a can identify a selection of a context interaction type and another party involved in the context interaction from input provided to the user interface 236. Further, prior to, during, or after the initiation of the context interaction on the user interface, the first client application 234a can generate a first symmetric key associated with the first client device 106a. The first client application 234a can transmit the first symmetric key to the prompt service 206. In some examples, the first client application 234a can transmit the first symmetric key as part of the initiation of the context interaction or a registration process with the prompt service 206. In some instances, the first client application 234a can dynamically generate a new symmetric key for each context interaction for improved security against unauthorized users.

In block 606, the first client application 234a can generate an asymmetric key pair (e.g., first private key, first public key) associated with the first client device 106a. In some instances, the first client application 234a can be generated based at least in part on the initiation of the context interaction or the generation of the symmetric key. In some examples, the asymmetric key pair is generated dynamically for each context interaction, as such each context interaction causes the generation of an asymmetric key pair for improved security.

The first client application 234a can transmit the first public key to the second client application 234b. The first client application 234a can transmit first public key via email, text message, local wireless network (e.g., Bluetooth, WiFi, Near Field Communication, etc.), or other suitable communication methods. In other examples, the first client application 234a can transmit the first public key to the second client application 234b by providing the first public key to the prompt service 206, in which the prompt service 206 can transmit the first public key to the second client application 234b.

In block 609, the first client application 234a can receive the second encrypted terms from the second client device 106b for the context interaction. The encrypted terms can be provided through the prompt service 206 or through other communication methods. In some examples, the first client application 234a also receives a second public key associated with the second client device 106b.

In block 611, the first client application 234a can display a user interface 234a on the first client device 106a for receiving a set of first private terms. In some examples, the first client application 234a can identity a set of minimum private terms that need to be provided for the identified context interaction (e.g., based at least in part on a selected context interaction, a selected template identifier, etc.). The user interface 234a can include user interface components for receiving the input for each of the minimum private terms. Additionally, the user interface 234a can include other user interface components for receiving input for other additional terms, conditions, expectations, and other suitable input for party A.

In block 612, the first client application 234a can generate first encrypted terms based at least in part on the first private terms provided by party A through the user interface 236 displayed on the first client device 106a. For example, as the seller, the party A can enter the minimum price the party A is willing to sell the item to party B. The first client application 234a can identify a minimum price as a first private term. Some non-limiting examples of other first private terms for this context interaction can include a payment method (e.g., cash, peer-to-peer system, check, financing, etc.), a deal expiration (e.g., an amount of time the price is valid), item characteristics (e.g., an item model, item color, item feature), and other suitable seller conditions.

After the first private terms have been identified, the first client application 234a can encrypt the first private terms using an encryption key, such as the first symmetric key or other suitable encryption key. In some examples, the second client device 106b does not have access to the symmetric key. As such, the first private terms can be concealed (e.g., as concealed data using an encryption scheme) from the second client device and the party B.

Further, the first client application 234a can generate a shared key for encryption. The shared key can be generated based at least in part on a first encryption key from the first client device 106a and a second encryption key from the second client device 106b. For example, the shared key can be generated using a Diffie-Hellman Key Exchange protocol based at least in part on a first private key from the first client device 106a and a second public key from the second client device 106b.

In block 615, the first client application 234a can transmit a prompt package for initializing a prompt session with the prompt service 206. In some examples, the prompt package can include a template identifier, the shared key, the encrypted terms (e.g., first encrypted content, second encrypted content), a second user identifier for party B, a first user identifier for party A, and other suitable content, such as other parameters and conditions.

In block 618, the first client application 234a can receive encrypted proposed terms from the prompt service 206. In some instances, the first client application 234a can be relayed from the second client application 234b.

In block 621, the first client application 234a can decrypt the proposed term using a decryption key and display the decrypted proposed term on the user interface 236. In some examples, the decryption key can be a shared key generated by the first client application 234a in block 612. The user interface 236 can include user interface components for an accepting the decrypted proposed terms, rejecting the decrypted proposed terms, or indicating a request to modify the proposed terms.

In block 624, the first client application 234a can determine whether party A wants to accept the decrypted proposed terms. If party A accepted the decrypted proposed terms, the first client application 234a proceeds to block 627. If the party A rejects the decrypted proposed terms, the first client application 234a proceeds to block 630.

In block 627, the first client application 234a can transmit an acceptance of the decrypted proposed terms to the prompt service 206. In some examples, the first client application 234a can transmit an acceptance message with a digital signature for authentication, in which the acceptance message is signed using the first private key. Other suitable methods can be used to authenticate the acceptance of the proposed terms by the first client device 106a.

In block 630, the first client application 234a can transmit a rejection of the proposed terms. In some examples, the first client application 234a can transmit a rejection message with a digital signature for authentication, in which the acceptance message is signed using the first private key. Other suitable methods can be used to authenticate the rejection of the proposed terms by the first client device 106a. The first client application 234a proceeds to the end.

Figure 6B:
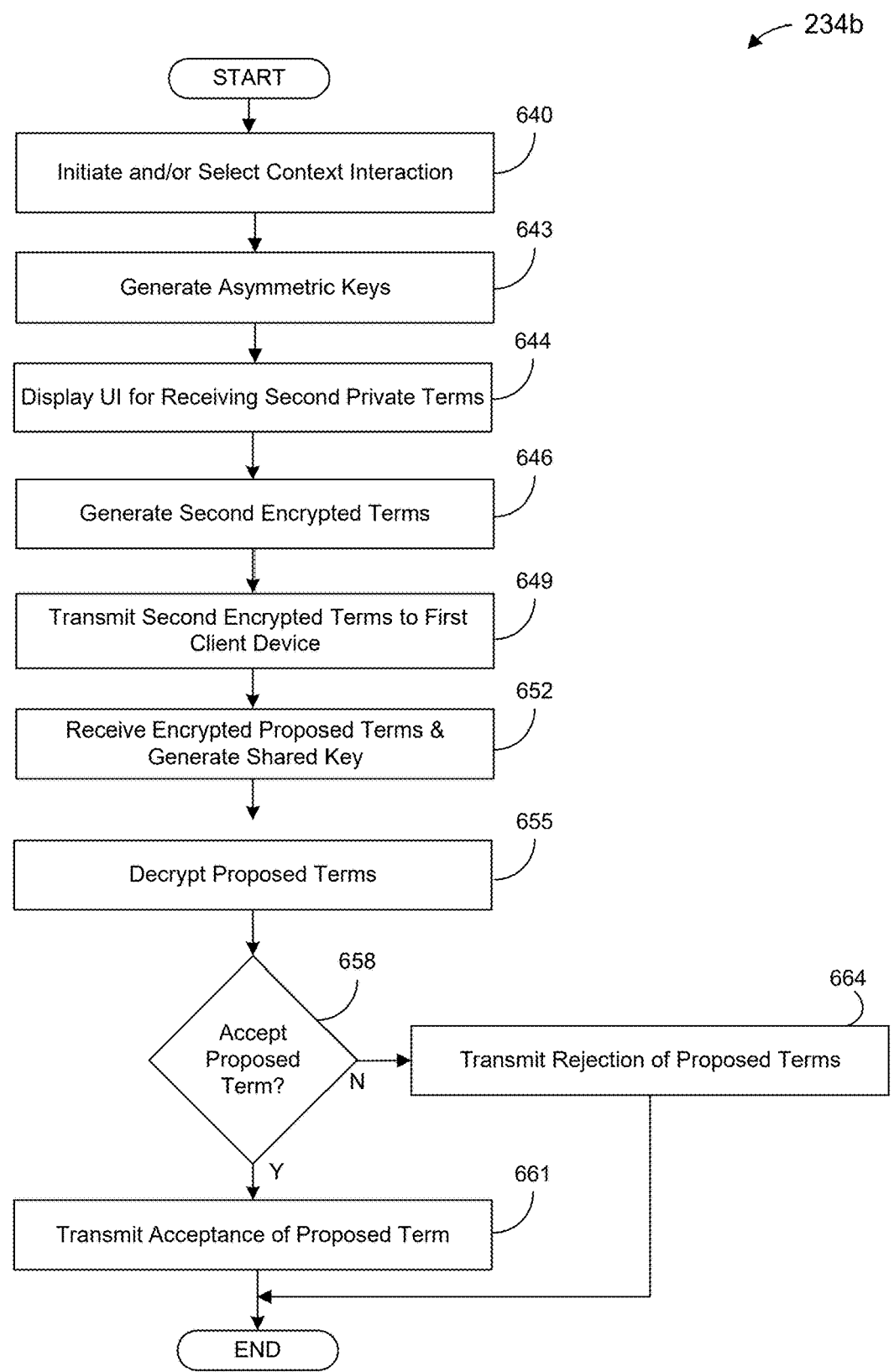

Referring next to FIG. 6B, shown is a flowchart that provides one example of the operation of a portion of the second client application 234b executed in the second client device 106b. The flowchart of FIG. 6B provides merely an example of the many different types of functional arrangements that can be employed to implement the operation of the depicted portion of the second client application 234b. As an alternative, the flowchart of FIG. 6B can be viewed as depicting an example of elements of a method implemented within the network environment 200.

Similar to FIG. 6A, party A can be operating a first client device 106a and party B can be operating a second client device 106b. Party A and party B can initiate an interaction for purchasing of an item. Party A can represent the seller and party B can represent the buyer. The functionality of FIG. 6B can be executed for other types of interactions. The data associated with the interaction can be stored as prompt session data 215.

In block 640, the second client application 234b can initiate and/or select a context interaction (e.g., for the purchase of the item). The second client application 234b can identify a selection of a context interaction type and another party involved in the context interaction from input provided to the user interface 236. In some embodiments, the second client application 234b can receive a request to participate in a context interaction (e.g., receiving a request from the first client device 106a). Further, prior to, during, or after the initiation of the context interaction on the user interface 236, the second client application 234b can generate a second symmetric key associated with the second client device 106b. The second client application 234b can transmit the second symmetric key to the prompt service 206. In some examples, the second client application 234b can transmit the second symmetric key as part of the initiation of the context interaction or a registration process with the prompt service 206. In some instances, the second client application 234b can dynamically generate a new symmetric key for each context interaction for improved security against unauthorized users.

In block 643, the second client application 234b can generate an asymmetric key pair (e.g., second private key, second public key) associated with the second client device 106b. In some instances, the second client application 234b can be generated based at least in part on the initiation of the context interaction or the generation of the symmetric key. In some examples, the asymmetric key pair is generated dynamically for each context interaction, as such each context interaction causes the generation of an asymmetric key pair for improved security.

The second client application 234b can transmit the second public key to the first client application 234a. The second client application 234b can transmit second public key via email, text message, local wireless network, an API call for the second client application 234b, or other suitable communication methods. In other examples, the second client application 234b can transmit the second public key to the first client application 234a by providing the second public key to the prompt service 206, in which the prompt service 206 can transmit the second public key to the first client application 234a.

In block 644, the second client application 234b can display a user interface 234b on the second client device 106b for receiving a set of second private terms. In some examples, the second client application 234b can identity a set of minimum private terms that need to be provided for the identified context interaction. The user interface 234b can include user interface components for receiving the input for each of the minimum private terms. Additionally, the user interface 234b can include other user interface components for receiving input for other additional terms, conditions, expectations, and other suitable input for party B.

In block 646, the second client application 234b can generate second encrypted terms based at least in part on the second private terms provided by party B through the user interface 236 displayed on the second client device 106b. For example, as the buyer, the party B can enter the maximum price the party B is willing to pay for the item to party A. The second client application 234b can identify maximum price as a second private term. Some non-limiting examples of other second private terms for this context interaction can include a payment method (e.g., cash, peer-to-peer system, check, financing, etc.), a deal expiration (e.g., an amount of time the price is valid), item characteristics (e.g., an item model, item color, item feature), and other suitable buyer conditions.

After the second private terms have been identified, the second client application 234b can encrypt the second private terms using an encryption key, such as the second symmetric key or other suitable encryption keys. In some examples, the first client device 106a does not have access to the second symmetric key. As such, the second private terms can be concealed from the first client device and party A.

In block 649, the second client application 234b can transmit the second encrypted terms to the first client device 106a. The second encrypted terms can be transmitted as a package that includes a second user identifier, the second encrypted terms, and other suitable data.

In block 652, the second client application 234b can receive the encrypted proposed terms from the prompt service 206. In some examples, the second client application 234b can generate a shared key for decrypting the encrypted proposed terms. The shared key can be generated based at least in part on a first encryption key from the first client device 106a and a second encryption key from the second client device 106b. For example, the shared key can be generated using a Diffie-Hellman Key Exchange Protocol based at least in part on a second private key from the second client device 106b and a first public key from the first client device 106a.

In block 655, the second client application 234b can decrypt the encrypted proposed terms. In some embodiments, the second client application 234b uses the shared key (e.g., the shared key from block 652) for decrypting the encrypted proposed terms.

In block 658, the second client application 234b can determine whether party B wants to accept the decrypted proposed terms. If party B accepted the decrypted proposed terms, the second client application 234b proceeds to block 661. If the party B rejects the decrypted proposed terms, the second client application 234b proceeds to block 664.

In block 661, the second client application 234b can transmit an acceptance of the decrypted proposed terms to the prompt service 206. In some examples, the second client application 234b can transmit an acceptance message with a digital signature for authentication, in which the acceptance message is signed using the second private key. Other suitable methods can be used to authenticate the acceptance of the proposed terms by the second client device 106b.

In block 664, the second client application 234b can transmit a rejection of the proposed terms. In some examples, the second client application 234b can transmit a rejection message with a digital signature for authentication, in which the acceptance message is signed using the second private key. Other suitable methods can be used to authenticate the rejection of the proposed terms by the first client device 106a. The second client application 234b proceeds to the end.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random-access portion of the memory and run by the processor, source code that can be expressed in proper format such as object code that is capable of being loaded into a random-access portion of the memory and executed by the processor, or source code that can be interpreted by another executable program to generate instructions in a random-access portion of the memory to be executed by the processor. An executable program can be stored in any portion or component of the memory, including random-access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random-access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random-access memory (SRAM), dynamic random-access memory (DRAM), or magnetic random-access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The sequence diagram of FIG. 4 and the flowcharts of FIGS. 4-6A, 6B show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the sequence diagram of FIG. 4 and the flowcharts of FIGS. 4-6A, 6B show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the sequence diagram of FIG. 4 and the flowcharts of FIGS. 4-6A, 6B can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random-access memory (RAM) including static random-access memory (SRAM) and dynamic random-access memory (DRAM), or magnetic random-access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 200.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear under-standing of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:

a computing device comprising a processor and a memory; and machine-readable instructions stored in the memory that, when executed by the processor, cause the computing device to at least:

receive a request to activate a prompt session for a first client device or a second client device, the request comprising a template identifier representing a type of interaction between the first client device and the second client device;

determine a decrypted term by decrypting an encrypted term associated with the request based at least in part on a symmetric key associated with the first client device or the second client device;

generate a large language model prompt based at least in part on the template identifier and the decrypted term;

generate a proposed term by executing a large language model application based at least in part on the large language model prompt, the proposed term being encrypted using a shared encryption key to generate an encrypted proposed term; and transmit the encrypted proposed term to the first client device or the second client device.

2. The system of claim 1, wherein the machine-readable instructions, when executed by the processor, cause the computing device to at least:

identify a registration request for the first client device and the second client device;

receive the symmetric key from the first client device or the second client device; and associate the symmetric key with a user profile for decrypting data associated with the first client device or the second client device.

3. The system of claim 1, wherein the shared encryption key is generated using a Diffie-Hellman Key Exchange Protocol.

4. The system of claim 1, wherein generating the large language model prompt further comprises inserting the decrypted term into a placeholder for a text prompt associated with the template identifier.

5. The system of claim 1, wherein the template identifier is associated with a data structure that comprises a first entity term, a second entity term, and a text prompt, the text prompt comprising a first instruction for concealing the first entity term from the second client device and a second instruction for concealing the second entity term from the first client device.

6. The system of claim 1, wherein the machine-readable instructions, when executed by the processor, cause the computing device to at least:

receive a rejection of the encrypted proposed term from the first client device or the second client device; and transmit a request for an alternative term to the first client device or the second client device.

7. The system of claim 1, wherein the encrypted term comprises a first encrypted term and a second encrypted term, and the machine-readable instructions, when executed by the processor, cause the computing device to at least:

identify a request to initiate a context interaction for the first client device and the second client device; and transmit a request for a public key to the first client device or the second client device based at least in part on the request to initiate the context interaction.

8. A method, comprising:

identifying, by a computer device, a request to active a prompt session, the requesting comprising a template identifier and an encrypted term;

determining, by the computing device, a decrypted term by decrypting the encrypted term based at least in part on a symmetric key associated with a first client device or a second client device;

generating, by the computing device, a large language model prompt based at least in part on the decrypted term and the template identifier;

generating, by the computing device, an encrypted pro-posed term based at least in part on inputting the large language model prompt to the large language mode to generate a proposed term, the proposed term being encrypted using a shared encryption key to generate the encrypted proposed term; and transmitting, by the computing device, the encrypted proposed term to the first client device or the second client device.

9. The method of claim 8, further comprising:

identifying, by the computing device, a registration request for the first client device and the second client device;

receiving, by the computing device, the symmetric key from the first client device or the second client device; and associating, by the computing device, the symmetric key with a user profile for decrypting data associated with the first client device or the second client device.

10. The method of claim 8, wherein the shared encryption key is generated using a Diffie-Hellman Key Exchange Protocol.

11. The method of claim 8, wherein generating the large language model prompt further comprises inserting the decrypted term into a text prompt associated with the template identifier.

12. The method of claim 8, wherein the template identifier is associated with a data structure that comprises a first entity term, a second entity term, and a text prompt, the text prompt comprising a first instruction for concealing the first entity term from the second client device and a second instruction for concealing the second entity term from the first client device.

13. The method of claim 8, further comprising:

receiving, by the computing device, a rejection of the encrypted proposed term from the first client device or the second client device; and transmitting, by the computing device, a request for an alternative term to the first client device or the second client device.

14. The method of claim 8, wherein the encrypted term comprises a first encrypted term and a second encrypted term, and further comprising:

identifying, by the computing device, a request to initiate a context interaction for the first client device and the second client device; and transmitting, by the computing device, a request for a public key to the first client device or the second client device based at least in part on the request to initiate the context interaction.

15. A non-transitory, computer-readable medium, comprising machine-readable instructions that, when executed by a processor of a first client device, cause the first client device to at least:

identify a request to initiate a context interaction with a second client device, the request being associated with a template identifier that represents a type of interaction between the first client device and the second client device;

generate an encrypted term for the template identifier based at least in part on an input received from a user interface and a symmetric key associated with the first client device;

generate a shared encryption key based at least in part on a private key associated with the first client device and a second public key associated with the second client device; and transmit a prompt package to a large language model application for generating a proposed term for the first client device and the second client device, the prompt package comprising the shared encryption key, the template identifier, the encrypted term, and an identifier for the second client device.

16. The non-transitory, computer-readable medium of claim 15, wherein the machine-readable instructions that, when executed by the processor of the first client device, cause the first client device to at least:

generate the private key and a first public key associated with the first client device in response to receiving the request to initiate the context interaction; and transmit the first public key to the second client device.

17. The non-transitory, computer-readable medium of claim 15, wherein generating the encrypted term for the template identifier further causes the first client device to encrypt the input using the symmetric key associated with the first client device, the input comprising a first party term for the context interaction.

18. The non-transitory, computer-readable medium of claim 15, wherein the template identifier is associated with a data structure that comprises a first placeholder, a second placeholder, and a text prompt, the text prompt comprising a first instruction for concealing data entered for the first placeholder from the second client device.

19. The non-transitory, computer-readable medium of claim 18, wherein the template identifier further comprises a second instruction for concealing data entered for the second placeholder from the first client device.

20. The non-transitory, computer-readable medium of claim 15, wherein the machine-readable instructions, when executed by the processor, further cause the first client device to at least:

display a user interface for selecting the context interaction and the identifier for the second client device, wherein the selection of the context interaction and the identifier for the second client device generates the request to initiate the context interaction with the second client device.

* * * * *